United States Patent Office 2,986,169
Patented May 30, 1961

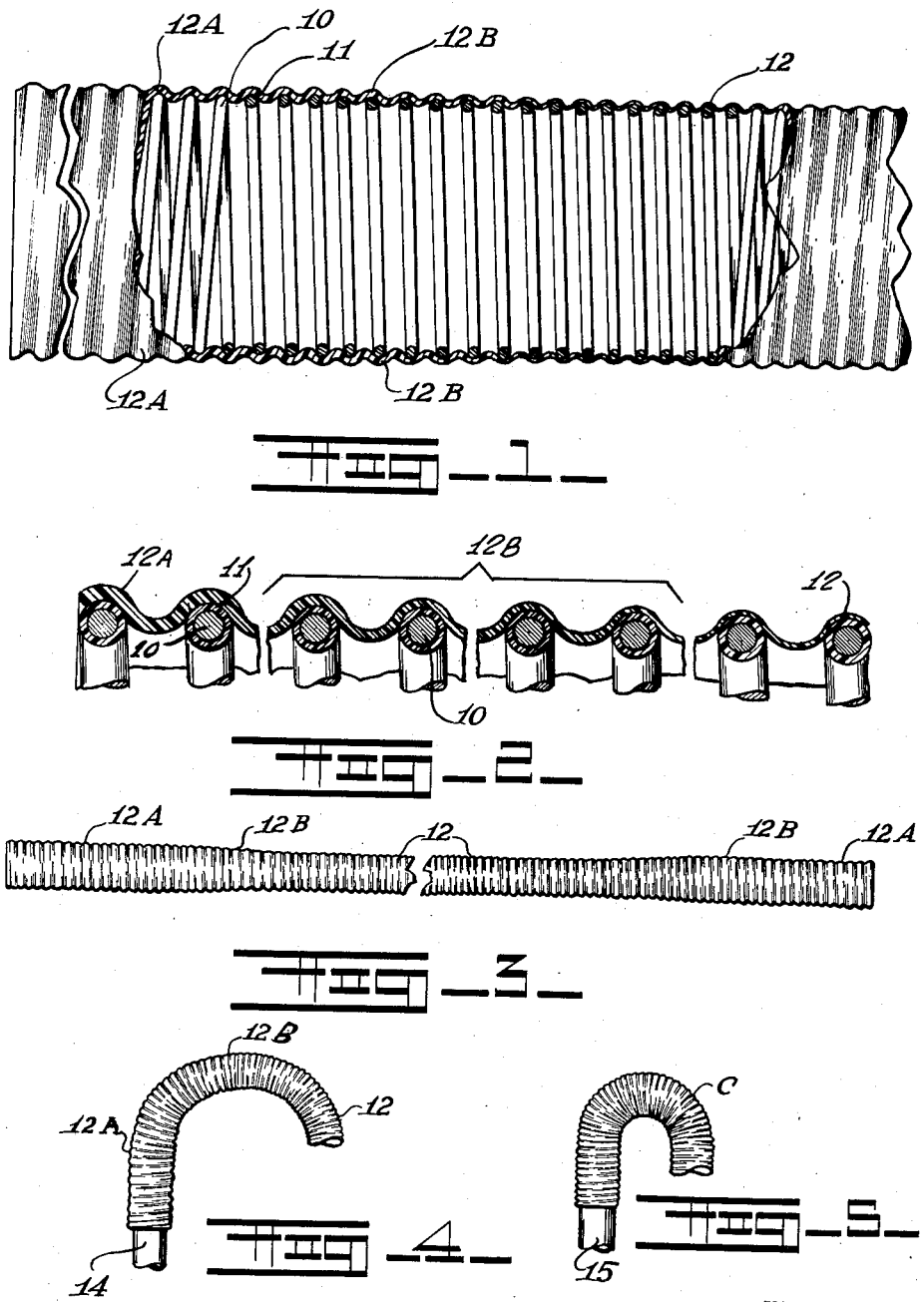

2,986,169
FLEXIBLE HOSE

Clarence E. McCormick, Poland, Ohio, assignor to Lee Rubber & Tire Corporation, Youngstown, Ohio, a corporation of New York Filed Mar. 18, 1957, Ser. No. 646,651
2 Claims. (Cl. 138—109)

This invention relates to a flexible hose and more particularly to a flexible hose taking the form of a fluid impervious conduit corrugated for flexibility and reinforced against radial collapse.

The principal object of the invention is the provision of a flexible reinforced hose having a cover thickened at one or both ends and an intermediate tapered transition section and a thinner body section, all of said cover being formed of one piece of plastic material.

A further object of the invention is the provision of a flexible vacuum hose comprising a tubular cover formed of plastic material around and about a spiral reinforcing member and wherein the tubular cover is formed with integral thickened sections adjacent the ends of the hose.

A still further object of the invention is the provision of a flexible reinforced hose such as used in connection with vacuum cleaners and the like and wherein integrally formed thickened end sections of the plastic cover of the hose are provided to stiffen the end sections so that bending thereof will involve a larger area of the hose than would otherwise be the case.

A still further object of the invention is the provision of a flexible vacuum hose having a plastic jacket disposed over a spiral wire and wherein the plastic jacket is of varying thickness with respect to longitudinally disposed areas of said hose so as to provide different degrees of resistance toward bending in different areas of the hose.

Those skilled in the art will be familiar with the formation of flexible hoses of lightweight plastic materials incorporating a spiral or radially disposed reinforcing member or members and wherein the completed hose is corrugated transversely thereof throughout its length and provides a lightweight, flexible, easily handled object.

Such hoses as have heretofore been produced have been formed with a jacket or cover of plastic material of uniform thickness with the result that the more frequent bending of the hose adjacent the ends thereof at the point in which couplings are inserted therein results in repeated flexing of the cover or jacket and the early failure thereof.

In order to overcome these deficiencies, the hose of the present disclosure provides that the end sections of the jacket or cover be thickened with respect to the remainder thereof and that the thickened sections taper gradually into the thinner intermediate body sections of the hose. Such formation increases resistance to bending at the points adjacent the couplings which are inserted in the ends of the hose and at the same time extends the area of bending over a greater length of the end sections with the result that the end sections of the hose formed in accordance with this invention have a life equal to the intermediate thinner covered body sections and are therefore advantageously employed by the vacuum cleaner users and others wherein flexible, lightweight and inexpensive construction are of paramount importance.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein:

Figure 1 is an elevation of a portion of a flexible hose with parts broken away and parts in cross section.

Figure 2 is an enlarged longitudinal cross sectional detail of the left end of the hose illustrated in Figure 1.

Figure 3 is a plan view of a section of hose having the middle portion thereof broken away.

Figure 4 is a plan view of a section of hose formed in accordance with the invention and bent upon itself.

Figure 5 is a plan view of a section of uniformly thin-wall flexible hose bent upon itself.

By referring to the drawing and Figure 1 in particular it will be seen that a section of flexible hose has been disclosed which includes a spirally wrapped reinforcing wire 10 which is preferably coated as at 11 and serves to support a continuous integrally formed plastic cover. The plastic cover is relatively thin as at 12 throughout the major or body portion of the hose and contributes to a high degree of flexibility of the hose. The plastic material is impervious and may or may not be joined to the covering 11 on the spiral reinforcing wire 10, as desired.

The end sections or terminal portions of the cover are indicated by the numerals 12A and it will be observed that they are relatively thicker than the body section 12, heretofore referred to, and from the thickened end sections 12A the cover tapers as at 12B into the thin body section 12.

It will be understood that the hose disclosed herein may be made in any desired length and that the thickened end sections 12A may be of any desired length relative to the entire section and that the intermediate tapering sections or portions 12B may be of any desired length.

The formation of the thickened end sections 12A and the intermediate tapering sections 12B of the cover 12 results in increasing the resistance to flexibility in said sections and the desirable tendency of the thickened sections to bend upon themselves in a relatively large arc, as best illustrated in Figure 4 of the drawing.

For the purpose of comparison, Figure 5 of the drawing shows the degree of bend resulting when the cover C of the hose is of uniform thickness throughout its length, while in Figure 4 of the drawing the thickened end sections 12A together with the intermediate tapering section 12B demonstrate the relatively wide, flat arc formed when the hose is allowed to bend backward upon itself. In both Figures 4 and 5 of the drawing metallic end couplings 14 and 15, respectively, are shown inserted in the ends of the hose.

By referring now to Figure 2 of the drawing it will be seen that an enlarged cross sectional detail of a portion of the hose shown in Figures 1, 3 and 4 of the drawing has been disclosed and that the cover section 12 is of uniform thickness throughout. The coating 11 is illustrated in relatively over-thick scale with respect to the diameter of the resilient reinforcing wire 10 on which it is formed.

The portions of the cover section 12 engaged against the exterior surface of the coating 11 on the resilient spiral wire 10 are preferably adhered thereto, if at all, only in the extreme innermost portions of the cover section 12 engaging the coating 11 so that stretching of the hose will move the normally corrugated cover section 12 into relatively flat, straight shape without any tendency for the cover section 12 to adhere to and follow the circumferential shape of the resilient spiral wire 10 and coating 11 thereon.

Those skilled in the art will recognize that the flexible plastic material referred to herein may comprise various well known thermoplastic resins including polyvinyl chloride, polyvinyl alcohol, vinyl chloride acetate resin, vinyl vinylidene chloride resin, polyethylene and the various synthetic flexible resins either by themselves or blended with other materials.

Reference to thermoplastic resins should be understood to include all of the plastic substances which will soften upon being subjected to varying degrees of heat, usually above room temperature, and the term "plastic" and/or thermoplastic resin as used herein refers to a material that contains as an essential ingredient an organic substance of large molecular weight, is solid in its finished state and at some stage in its manufacture or in its processing into a finished article can be shaped by flow. One such thermoplastic resin or compound found to be suitable for the cover of the present invention is polyvinyl chloride which is available commercially under the trade name "Geon."

Those skilled in the art will recognize that the cover or coating 11 on the spiral wire 10 is preferably of a plastic nature like that of the cover.

It will thus be seen that the flexible reinforced impervious vacuum hose disclosed herein comprises primarily the spiral reinforcing and supporting wire 10 and the unitary plastic cover 12 thickened adjacent the end sections of the hose, as hereinbefore set forth.

It will thus be seen that the several objects of the invention have been met by the flexible hose disclosed herein.

Having thus described my invention, what I claim is:

1. A flexible hose corrugated from end to end, said hose comprising a continuous reinforcing helically-formed wire extending from end to end of said hose with a one-piece flexible covering exteriorly thereover and in intimate contact therewith and having exteriorly thereof a helical groove extending from end to end of said covering with the convolutions of said wire and groove alternating, the covering comprising a main body portion of substantially uniform predetermined thickness, a terminal portion spaced a substantial distance from one end of said main body portion, an intermediate portion of appreciable length between said two portions, the wall thickness of the terminal portion being appreciably greater than the thickness of the main body portion, and said intermediate portion tapering in thickness from that of said terminal portion to that of said body portion.

2. The flexible hose as defined in claim 1 wherein there is an additional terminal portion spaced a substantial distance from the other end of the main body portion, and there is an intermediate portion of appreciable length between said additional terminal portion and said other end of the main body portion, said intermediate portion tapering in thickness from that of the additional terminal portion to that of said body portion.

References Cited in the file of this patent

UNITED STATES PATENTS

| | | |
|---|---|---|
| 2,236,731 | Oberly | Apr. 1, 1941 |
| 2,396,059 | Roberts | Mar. 5, 1946 |
| 2,560,369 | Roberts | July 10, 1951 |
| 2,657,364 | Carr | Oct. 27, 1953 |
| 2,739,616 | Duff | Mar. 27, 1956 |
| 2,822,857 | Rothermel et al. | Feb. 11, 1958 |

FOREIGN PATENTS

| | | |
|---|---|---|
| 11,422 | Great Britain | May 31, 1905 |
| 352,198 | Great Britain | July 9, 1931 |